United States Patent [19]

Shuto

[11] Patent Number: 5,161,758

[45] Date of Patent: Nov. 10, 1992

[54] CONNECTING SYSTEM FOR TROLLEY RAILS FOR TRANSPORT VEHICLE

[75] Inventor: Masamoto Shuto, Tokyo, Japan

[73] Assignee: HSST Corporation, Tokyo, Japan

[21] Appl. No.: 798,620

[22] Filed: Nov. 26, 1991

[30] Foreign Application Priority Data

Nov. 30, 1990 [JP] Japan .................. 2-339672

[51] Int. Cl.⁵ ............................................. B60M 1/32
[52] U.S. Cl. .................................... 246/419; 191/38; 104/130
[58] Field of Search ................... 246/419; 191/32, 38; 104/130, 130.1

[56] References Cited

U.S. PATENT DOCUMENTS

| | | | |
|---|---|---|---|
| 2,161,424 | 6/1939 | McKeige et al. | 246/419 X |
| 2,649,509 | 8/1953 | Lewis | 246/419 X |
| 3,964,398 | 6/1976 | Breitling | 104/130.1 |
| 4,090,452 | 5/1978 | Segar | 191/32 X |
| 4,453,051 | 6/1984 | Brown | 191/38 X |
| 5,020,441 | 6/1991 | Burg | 246/419 X |

Primary Examiner—Frank E. Werner
Assistant Examiner—Scott L. Lowe
Attorney, Agent, or Firm—Koda and Androlia

[57] ABSTRACT

A connecting system for trolley rails at a shunt where tracks for a transport vehicle such as a magnetic levitation type linear motor car are turned off. A first trolley rail is supported on a stationary track girder and a second troley rail is supported on a movable track girder. A movable track girder can be moved from a position where one end thereof is aligned to a first stationary track girder to a position where the end thereof is aligned to a second stationary track girder. A third trolley rail is movably supported in a longitudinal direction thereof on a supporting member which is rotatably supported at one end thereof to a base portion of one end of the first trolley rail. A first slant surface is formed on each of end portions of the first and second trolley rails at an acute angle. Both end portions of the third trolley rail are formed with slant surfaces inclined at obtuse angles with the top peripheral edge of the third trolley rail. As the third trolley rail is inserted between the end portions of the first and second trolley rails, the third trolley rail is guided by the slant surfaces and the third trolley rail is connected with the first and second trolley rails.

3 Claims, 4 Drawing Sheets

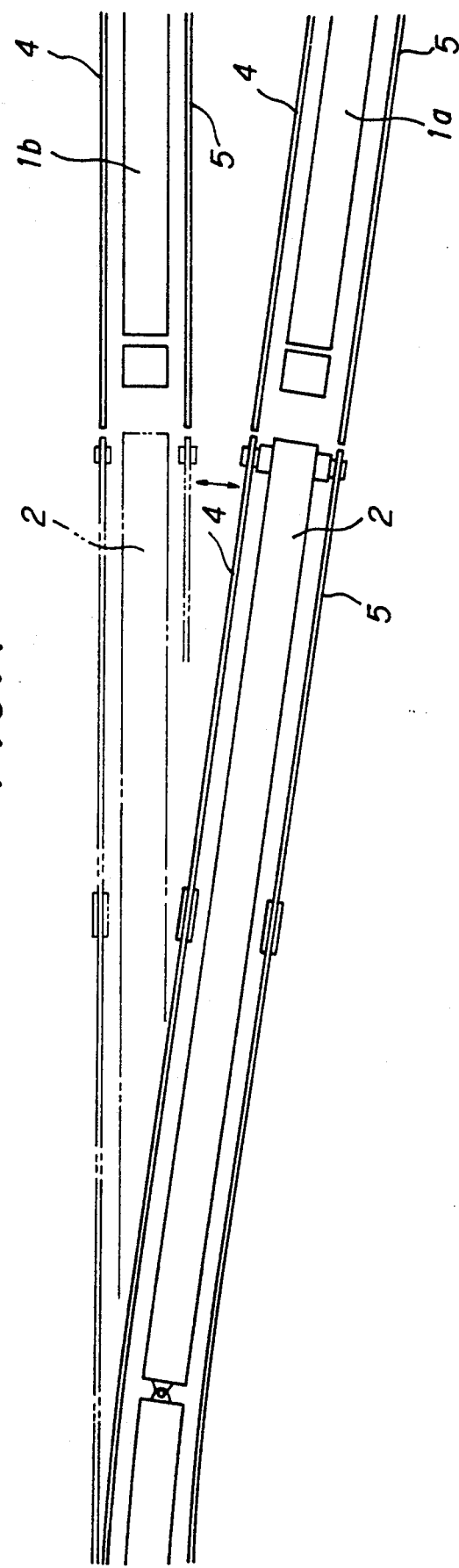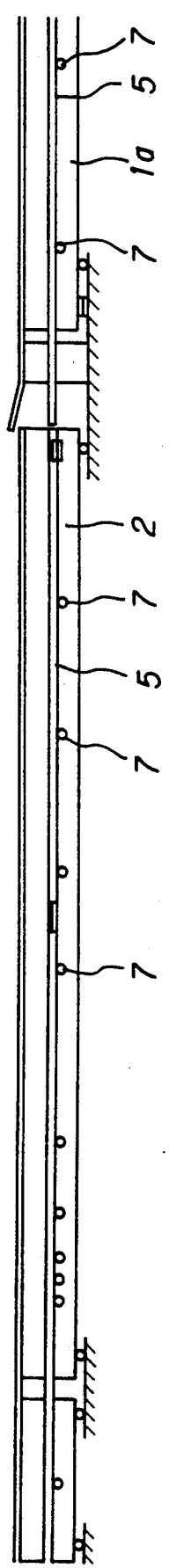
FIG.1
FIG.2

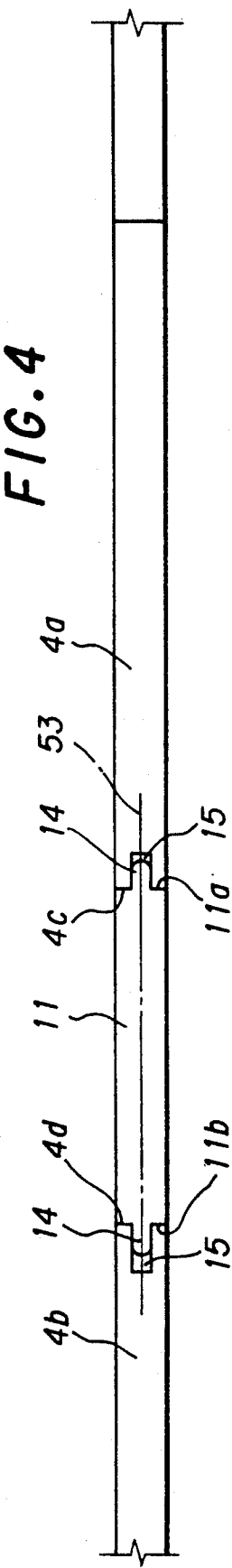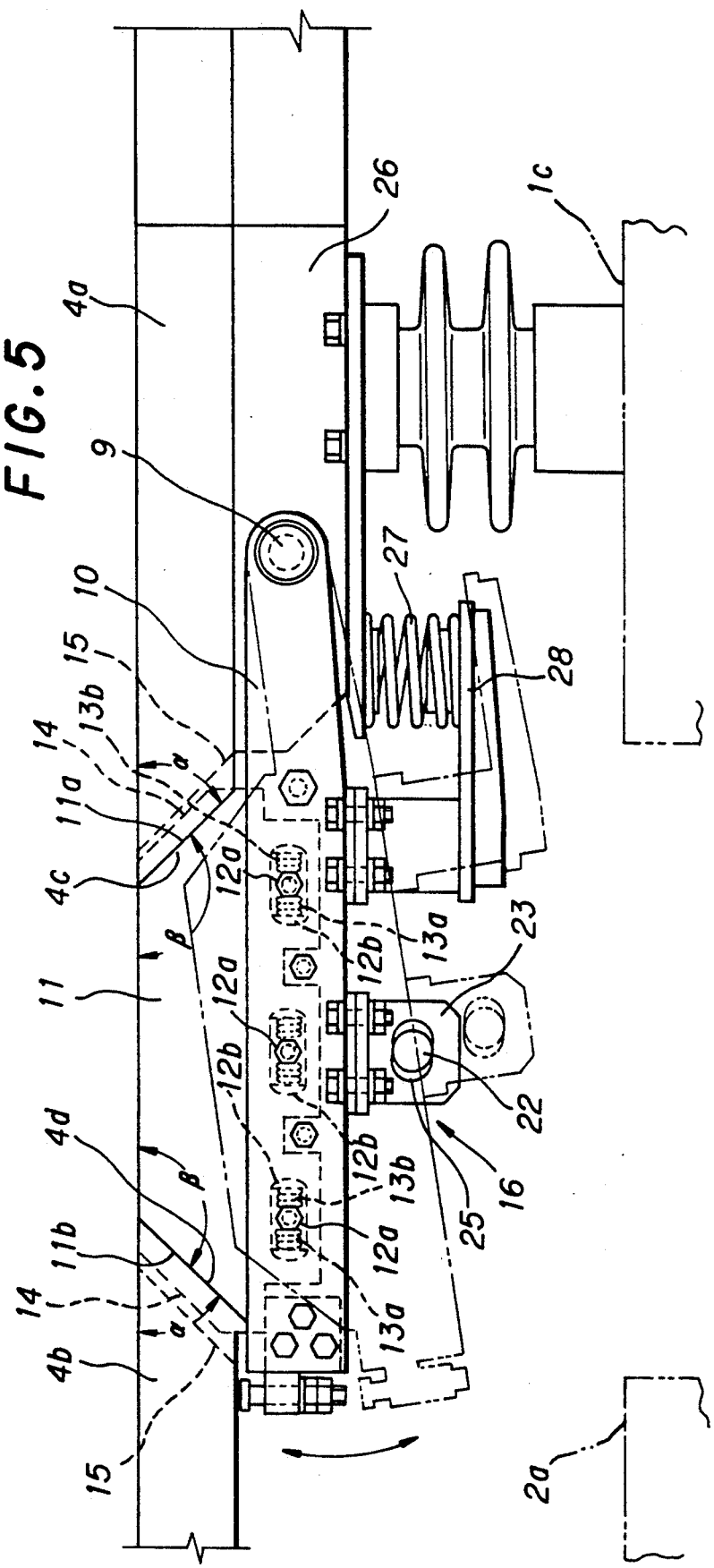

CONNECTING SYSTEM FOR TROLLEY RAILS FOR TRANSPORT VEHICLE

BACKGROUND OF THE INVENTION

1. Field of the Invention

The present invention relates to a switching system for trolley rails for supplying electric power without interruption to transport vehicles, in particular railway vehicles driven by a linear motor system and trains using a magnetic levitation system, during traveling.

2. Description of the Prior Art

A transport vehicle such as a linear motor car adopting a magnetic levitation system or the like travels on a track girder fixed on the ground (hereinafter called as stationary track girder) and electric power required for the transport vehicle is supplied by contacting collector shoes of a current collecting apparatus installed in the transport vehicle with trolley rails (also called as third rails) supported on the track girders and connected to a power supply.

A shunt for turning off the transport vehicle from a first stationary track girder to a second stationary track girder is operated such that a track girder movably arranged on the ground (hereinafter called a movable track girder) is applied and the movable track girder is moved from a position aligning with the first stationary track girder to a position aligning with the second stationary track girder so as to perform a shunt operation. Although the movable track girder also has the trolley rail as the same position as the position of the trolley rail fixed on the stationary track girder, there may occur non-continuous portions of a relative large-sized size between the ends of the trolley rails fixed to the stationary track girder and the end of the trolley rails fixed to the movable track girder as compared with the size of each of the collector shoes of the current collecting apparatus contacting with the trolley rails. Upon completion of the turning off of the movable track girder, there may frequently occur a stepping or a difference in level at the sliding surfaces of the trolley rails to which the collector shoes of the current collecting apparatus are contracting at the non-continuous portions. In this case, sliding of the collector shoes of the current collecting apparatus against the trolley rails may not be carried out smoothly causing the collector shoe and the trolley rails to be damaged.

SUMMARY OF THE INVENTION

It is a primary object of the present invention to provide a connecting system for trolley rails for transport vehicles in which a trolley rail for a transport vehicle supported on a movable track girder and a trolley rail for a transport vehicle supported on a stationary track girder are connected without producing any non-continuous portion.

It is another object of the present invention to provide a connecting system for trolley rails for transport vehicles in which a trolley rail for the transport vehicle supported on a movable track girder and the trolley rail for the transport vehicle supported on a stationary track girder are connected without producing any stepping or difference in level in sliding surfaces against collector shoes of a current collecting device installed in the transport vehicle.

It is a still further object of the present invention to provide a connecting system for trolley rails for transport vehicles in which the connection between trolley rails without producing any non-continuous portions as described above and without producing any stepping or difference in level in sliding surfaces as described above may easily be carried out.

According to the present invention, the connecting system for trolley rails for transport vehicles is comprised of a supporting member movably supported in a direction crossing moving direction of a movable track girder movable to a position for turning off the transport vehicle to a stationary track girder at an end portion of a first trolley rail supported on the stationary track girder; a second trolley rail having an end thereof and supported on the movable track girder; a third trolley rail having a length to be inserted between an end of the first trolley rail supported on the stationary track girder and an end of the second trolley rail supported on the movable track girder; supporting means for supporting the third trolley rail on a supporting member; spring means arranged between the third trolley rail and the supporting member; and shifting means for moving the supporting member between a connecting position where the third trolley rail is connected at both ends to the first and second trolley rails and a connection releasing position where the third trolley rail is moved away from the first and second trolley rails.

At the ends of the first and second trolley rails, there is formed first slant surface inclined in the longitudinal direction of each of the first and second trolley rails, respectively. The third trolley rail is formed at their both ends with second slant surfaces inclined in a longitudinal direction of the third trolley rail to fit the first slant surfaces formed at each ends of the first and second trolley rails. The supporting means movably support the third trolley rail in the longitudinal direction of the supporting member by a predetermined distance in the longitudinal direction of the third trolley rail, and spring means apply a spring force against the third trolley rail toward both longitudinal directions. With such an arrangement, the third trolley rail is supported by the supporting means at a position where the spring forces are balanced in both directions and when the external force is acted thereupon in the longitudinal directions, the third trolley rail can be moved in the longitudinal directions relative to the longitudinal direction of the supporting member within a range of the predetermined distance.

In addition, the first slant surface and the second slant surface are formed with guiding means for engaging with each other and guiding the third trolley rail in order to side surfaces of the third trolley rail which are to be contacted with the collector shoes of the current collecting apparatus for the transport vehicle to cause to be in flush with side surfaces of the first and second trolley rails where the collector shoes of the current collecting apparatus are to be contacted therewith.

In accordance with the present invention, when the movable track girder is moved to a position where the transport vehicle is to be turn of to the stationary track girder, the supporting member shunted at the connection releasing position is brought by the shifting means to the connecting position, thereby the third trolley rail supported on the supporting member is inserted between the end portions of the first trolley rail supported on the stationary track girder and the end portion of the second trolley rail supported on the movable track girder, resulting in that the second slant surfaces formed at both ends of the third trolley rail are abutted against the first slant surfaces formed at the end portions of the first and second trolley rails. The supporting means and the spring means may adjust the longitudinal positions of the third trolley rails when the second slant surfaces formed at both ends of the third trolley rail are abutted against the first slant surfaces formed at the end portions of the first and second trolley rails. In turn, the guiding means formed at the slant surfaces may assure the connection between the first, second and third trolley rails and further assure that both side surfaces of the first, second and third trolley rails being extended in a same plane and no stepping or difference in level being produced at the surface where the collector shoes provided in the current collecting apparatus for the transport vehicle are to be slidably contacted.

When the movable track girder is to be moved, the supporting member is moved to the connection releasing position in a direction crossing a moving direction of the movable track girder by a shifting means and then the supporting member is shunted from the moving range of the movable track girder together with the third trolley rail.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through several views and wherein:

FIG. 1 is a top plan view for showing a shunt for the track girders.

FIG. 2 is a side elevational view of FIG. 1.

FIG. 4 is a top plan view for showing connection between the trolley rails in the aforesaid preferred embodiment.

FIG. 5 is a side elevational view for showing connecting operation of the trolley rails according to the present invention.

DETAILED DESCRIPTION OF THE PREFERRED EMBODIMENTS

Figure 3:
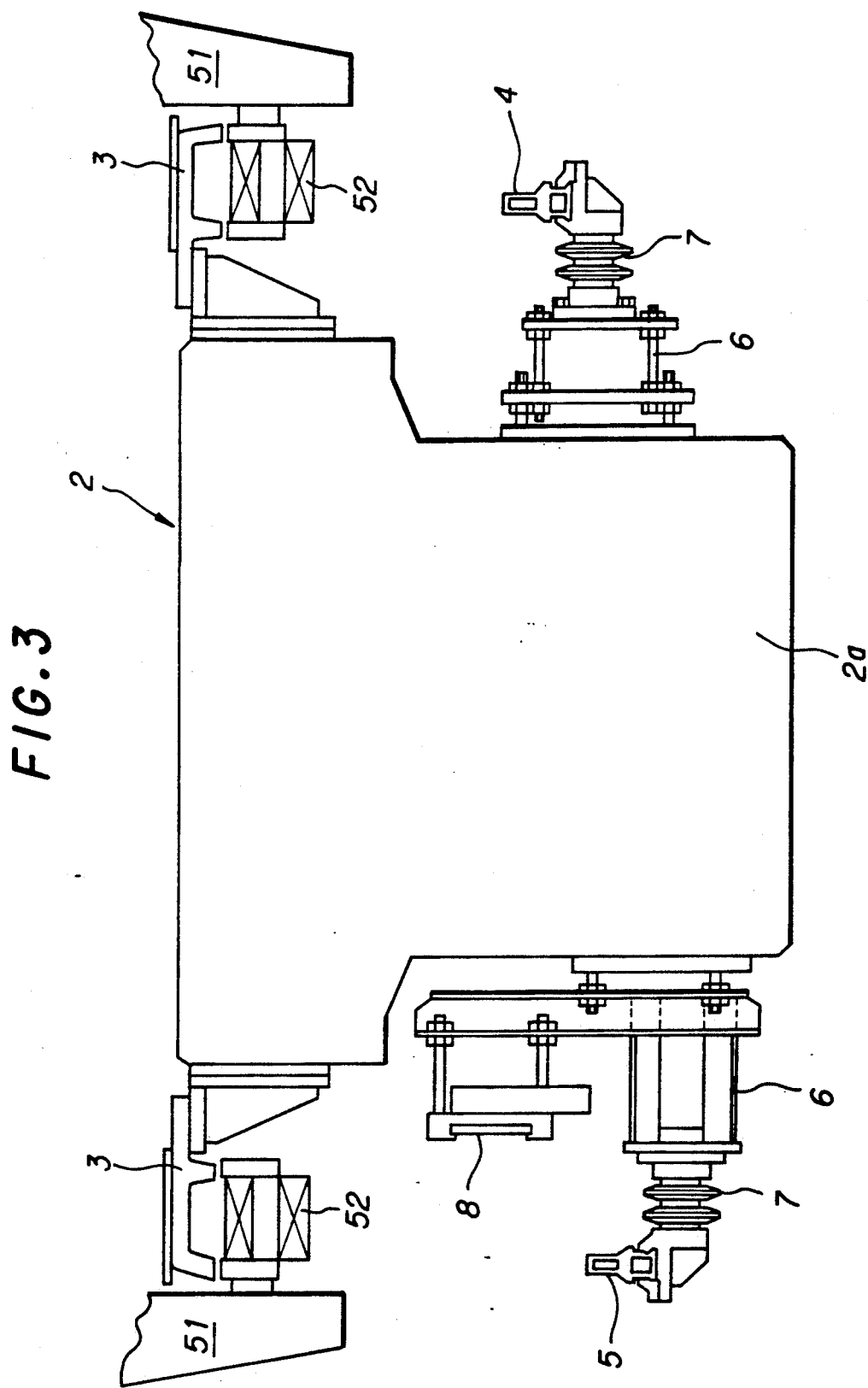
FIG. 3 is a front elevational view for showing an end portion of a stationary track girder in one preferred embodiment of the present invention.

FIGS. 1 and 2 schematically illustrate a shunt where a movable track girder 2 is moved between a first stationary track girder 1a and a second stationary track girder 1b. The shunt allows for the turning off of a transport vehicle. Reference numeral 4 denotes a trolley rail connected to a positive terminal of power supply, reference numeral 5 denotes a trolley rail connected to a negative terminal of the power supply and reference numerals 7 denote insulators supported on each of the track girders 1a, 1b and 2.

FIG. 3 is a front elevational view for showing an end surface of the movable track girder 2. On the movable track girder 2, the trolley rail 4 is supported by the insulator 7 on a bracket 6 fixed to one side surface of a track girder 2a, and the trolley rail 5 is similarly supported at the other side surface of the track girder 2a by the bracket 6 and the insultor 7. Rails 3 for guiding a transport vehicle 51 are fixed to both side edge portions of top surface of the track girder 2a by brackets, respectively. In this figure, the transport vehicle 51 is a linear motor car levitated by a magnetic retracting force between the rails 3 and electromagnets 52 arranged on truck bodies of the transport vehicle 51. To one side surface of the track girder 2a is supported a signal line 8 as required.

The manner of supporting the rails 3 and the trolley rails 4 and 5 in the stationary track girders 1a and 1b is the same as that in the movable track girder 2, therefore a description thereof will be eliminated. A connecting system for the trolley rails to be described later has the same configuration as to the connection for the trolley rail 4 connected to the positive terminal of the power supply as to the connection for the trolley rail 5 connected to the negative terminal of the power supply, so that only the connection for the trolley rail 4 will be described.

In FIG. 4, reference numerals 4a and 4b denote a portion of the trolley rail 4 connected to the negative terminal of the power supply, respectively, wherein reference numeral 4a denotes a first trolley rail supported on the stationary track girder 1a and reference numeral 4b denotes a second trolley rail supported on the movable track girder 2, respectively. As shown in FIG. 1, since the movable track girder 2 is moved between one position where it is aligned with the first stationary track girder 1a and the other position where it is aligned with the second stationary track girder 1b, there may be generated a relative large spacing between the first trolley rail 4a and the second trolley rail 4b. Thus, in the present invention, as shown in FIG. 4, a third trolley rail 11 is prepared for connecting the end of the first trolley rail 4a with the end of the second trolley rail 4b. The third trolley rail 11 has the same configuration as the first and the second trolley rails 4a and 4b. The third trolley rail 11 is supported on a supporting member 10 pivotally supported by a supporting pivot 9 at an end portion of the first trolley rail 4a supported on the stationary track girders 1a and 1b. The supporting pivot 9 is connected to a base portion of the first trolley rail 4a or a fixing member 26 thereof to avoid placing the pivot 9 on a side surface near the top portion of the first trolley rail 4a across which the collector shoes (not shown) of a current collecting apparatus for the transport vehicle slides. On the supporting pivot 9, one longitudinal end of the supporting member 10 is rotatably supported.

The supporting member 10 is constructed such that two plate-like members having a length extending from lower portions of free end of the first trolley rail 4a supported on stationary track girders 1a and 1b, respectively, to lower portions of free end of the second trolley rail 4b supported on the movable truck girder 2 are fixed while a spacing being held between these members. The third trolley rail 11 is made such that both side surfaces near the top peripheral portion for contacting with the shoes of the current collecting apparatus for the transport vehicle are exposed out of the upper peripheral edges of the two plate-like members constituting the supporting member 10 and then either the base portion or the fixing member 26 is inserted between the two plate-like members. Pins 12a are fixed to either one of the supporting member 10 or the third trolley rail 11 in a direction of width of the supporting member 10, and long holes 12b having longitudinal direction thereof along a longitudinal direction of the supporting member 10 are formed in the other one. Further, each of the pins 12a is inserted into each of the long holes 12b to support the third trolley rail 11 in such a way that the third rail 11 can be moved in its longitudinal direction in respect to the longitudinal direction of the supporting member 10. Within each of the long holes 12b are arranged coil springs 13a and 13b of which one ends are abutted against one of both longitudinal ends of the long holes 12b and of which the other ends are abutted against the pins 12a, respectively. Biasing force of the coil springs 13a and 13b for biasing the third trolley rail 11 is affected to the pins toward both longitudinal directions of the supporting member 10. When a large external force is not acted upon the third trolley rail 11, the third trolley rail 11 is held at the position where the spring force of the coil springs 13a and 13b providing two-directional biasing force are balanced. In an embodiment illustrated in FIG. 5, the pins 12a are fixed to the supporting member 10 and the long holes 12b are formed in the third trolley rail 11.

While the movable track girder 2 is moving, the supporting pivot 9 functions for retracting the supporting member 10 and the third trolley rail 11 from the moving range of the movable track girder 2 and the second trolley rail 4b to cause the supporting member 10 to be moved in a direction crossing with the moving direction of the movable track girder 2. In the embodiment shown in FIG. 5, the movable track girder 2 and the second trolley rail 4b are moved in the horizontal plane (a plane perpendicular to the sheet), the supporting pivot 9 has its center axis in the horizontal plane to cause the supporting member to be moved in a vertical plane (a plane parallel with the sheet).

At the end portion of the first trolley rail 4a supported on the stationary track girder 1a and the end portion of the second trolley rail 4b supported on the movable track girder 2 are formed linear slant surfaces 4c and 4d inclined in the longitudinal directions of the trolley rails 4a and 4b and crossing at a predetermined acute angle α to top peripheral edge of the trolley rails 4a and 4b. At both ends of the third trolley rail 11 supported on the supporting member 10 are formed linear slant surfaces 11a and 11b crossing at an angle β to top peripheral edge of each of the third trolley rail 11 in the longitudinal direction thereof in which the angle β is a value subtacted angle α from 180°. On each of the slant surfaces 4c and 4d formed at the first and second trolley rails 4a and 4b is formed with a linear groove 15 having its center on center line 53 (FIG. 4) in a direction of width of each of the trolley rails 4a and 4b. In turn, on each of the slant surfaces 11a and 11b formed at both ends of the third trolley rail 11 is formed with a linear projection 14 having its center on the center line 53 in a direction of width of the third trolley rail 11. Side surfaces in parallel with the center line 53 of the projections 14 function to closely engage with the side walls of the grooves 15 in parallel with the center line so as to cause both side surfaces of the third trolley rail 11 contacting with the collector shoes of the current collecting apparatus for the transport vehicle and both side surfaces of the first and second trolley rails 4a and 4b contacting with the collector shoes of the current collecting apparatus for the transport vehicle to be present in the same plane.

As shown in FIG. 5, free end portion formed with the slant surfce 4d in the second trolley rail 4b supported on the movable track girder 2 lacks the base portion or the fixing member 26 thereof described in reference to the first trolley rail 4a. The supporting member 10 is moved downward with one end thereof with the supporting pivot 9 as a center of rotation by a shifting means which is to be described later and then the supporting member 10 is held at a position where the end portion of the third trolley rail 11 at the side opposing against the movable track girder 2 is lower than that of the second trolley rail 4b (this position being defined as a connection releasing position). When the movable track girder 2 is moved up to a position aligning with the stationary track girder 1a and stopped, the supporting member 10 is lifted up by the shifting means around the supporting pivot 9. With this lifting movement, the projection 14 formed at the slant surface 11a of the end portion of the third trolley rail 11 opposing against the end portion of the first trolley rail 4a is inserted into the groove 15 formed in the slant surface 4c of the first trolley rail 4a, and then the projection 14b formed at the slant surface 11b of the end portion of the third trolley rail 11 opposing against the end portion of the second trolley rail 4b is inserted into the groove 15 formed in the slant surface 4d of the second trolley rail 4b, resulting in that the slant surfaces 11a and 4c are abutted and contacted to each other and further the slant surfaces 11b and 4d are also abutted and contacted to each other. With such an arrangement, there trolley rails, the first, second and third trolley rails 4a, 4b and 11, are connected with each other. This state is indicated by a solid line in FIG. 5, wherein a position indicated by the solid line in the supporting member 10 is defined as a connecting position.

The trolley rails may generate their extended or retracted states under a variation of their temperatures. Accordingly, a distance between one end of the first trolley rail 4a and one end of the second trolley rail 4b is varied in seasons, and the longitudinal length of the third trolley rail 11 is also varied in seasons. However, the slant surfaces 4c and 4d formed at each of the end portions of the first and second trolley rails 4a and 4b are inclined against the top peripheral edge of each of the rails at an acute angle α in respect to the top peripheral edge thereof. The slant surfaces 11a and 11b formed at both ends of the third trolley rail 11 are inclined at an obtuse angle β in which the angle β is subtracted angle α from 180° in respect to the top peripheral edge of the rail, so that irrespective of the longitudinal extension or retraction of the three trolley rails 4a, 4b and 11, the abutting and contacting of the slant surface to each other are positively carried out and they have no trouble in their connections. Each of the trolley rails 4a, 4b and 11 has the same cross-sectional shape at the portion to which the collector shoes of the current collecting apparatus of the transport vehicle are contacted. The projection 14 and the groove 15 are formed around the center line of a section at a plane perpendicular to the longitudinal direction of each of the trolley rails as the center of symmetry, so that both side surfaces of the connecting portions of the third rail 11 and the trolley rails 4a and 4b and to which the collector shoes of the current collecting apparatus contacted are always located in the same plane without having any relation with a variation in temperature under an engagement between the projection 14 and the groove 15. And at the same time, there is no stepping or difference in level in the connecting portions. As a result, the collector shoes of the current collecting apparatus can be smoothly contacted with the trolley rails 4a, 4b and 11. When each of the trolley rails 4a, 4b and 11 is extended due to an increased surrounding air temperature, even if the top peripheral portion of the third trolley rail 11 is located at a lower position than that of the first and second trolley rails 4a and 4b or when each of the trolley rails 4a, 4b and 11 is reduced due to a reduction of a surrounding air temperature, the top peripheral portion of the third trolley rail 11 is located at a higher position than that of the first and second trolley rails 4a and 4b, the connecting system for trolley rails for transport vehicle in which the collector shoes of the current collecting apparatus are to be contacted to both side surfaces of the trolley rails according to the present invention may not influence the current collection performed by the current collecting apparatus.

Figure 6:
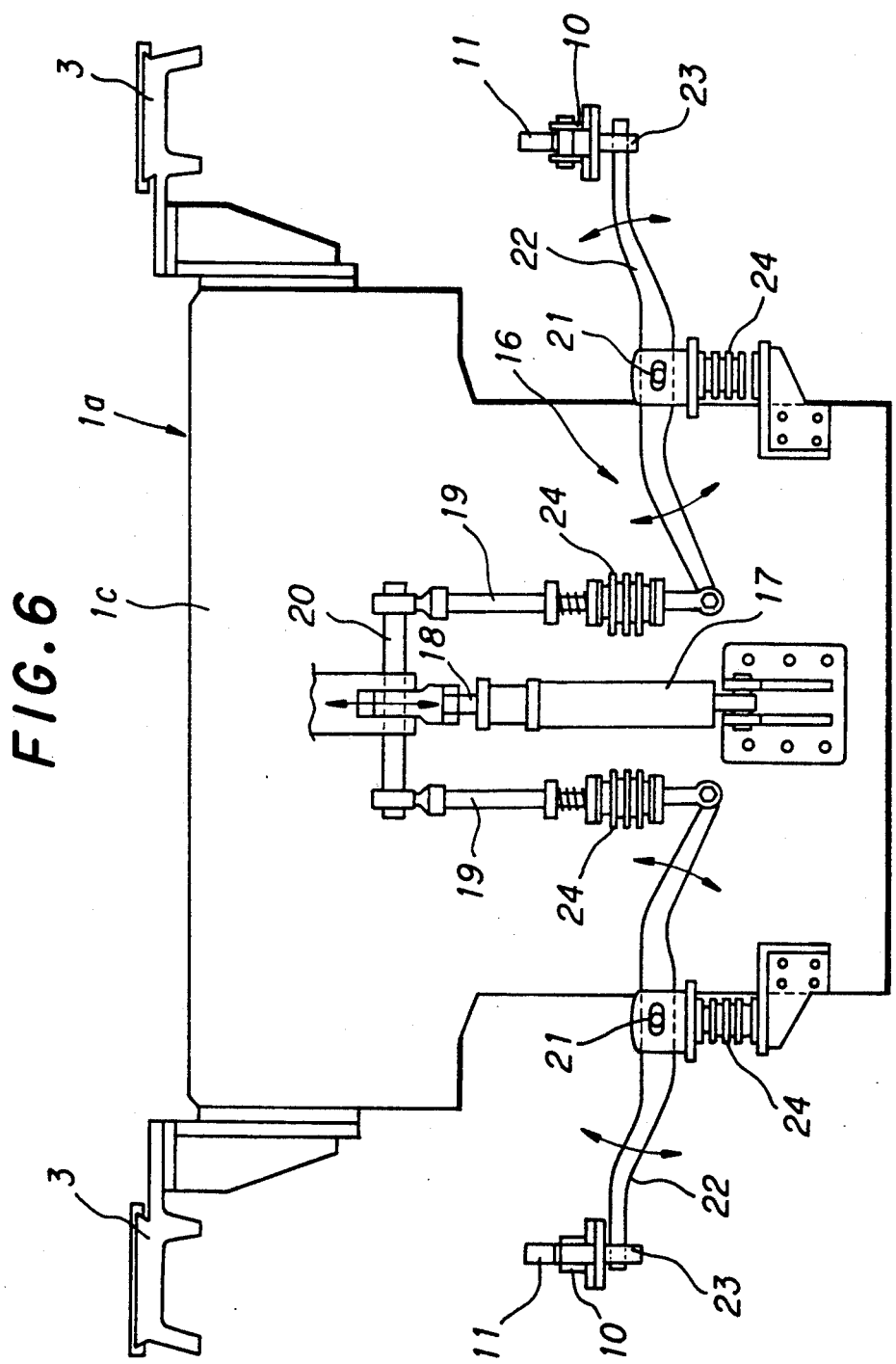
FIG. 6 is a schematic view for showing shifting means in the aforesaid preferred embodiment.

As shown in FIG. 6, the shifting means 16 is comprised of a driving cylinder 17 fixed to an end surface of a track girder 1c at the longitudinal end of the stationary track girder 1a through a bracket, a piston rod positively driven in an upward or downward direction with a hydraulic pressure supplied to the driving cylinder 17, linkage levers 19 connected to a piston rod 18 through a connecting lever 20, and swing arms 22 of which one end is rotatably connected to the lower end of the linkage lever 19 and the central portion of which is rotatably supported by a fulcrum 21 supported on a bracket fixed to the track girder 1c. As shown in FIG. 5, a bracket 23 having an elliptical through-hole 25 is fixed to the bottom peripheral edge of the supporting member 10, and the other end of the swing arm 22 is loosely inserted into the through hole 25. When the position rod 18 of the shifting means 16 is moved downwardly with hydraulic oil supplied to the driving cylinder 17, the supporting members 10 are caused to be lifted up and further the supporting members 10 is caused to move to the connecting position. When the piston rod 18 of the shifting means is moved to upwardly, the supporting members 10 is caused to be lowered and further the supporting members 10 is caused to move to the connection releasing position.

The shifting means 16 is provided with insulators 24 at required locations so as to prevent an electrical leakage from the third trolley rails 11. To the supporting member 10 a canti-levered plate-like spring seat 28 is fixed through a bracket. A compression spring 27 is placed between the free end of the spring seat 28 and the bottom peripheral edge of the first trolley rail 4a to bias the supporting member 10 to be held at its connecting position. Even if the driving cylinder 17 in the shifting means 16 is suffered with leakage of hydraulic oil, the connected states of the first, second and third trolley rails 4a, 4b and 11 are kept under the presence of the spring 27 and thus the connection of these trolley rails may not be damaged.

In FIG. 6, it is shown that a pair of shifting means 16 and 16 are operated by a single driving cylinder 17. As described in detail, one of the pair of shifting means 16 and 16 is a shifting means for the supporting members 10 for use in connecting the trolley rails 4a and 4b connected to the positive terminal of the power supply with the third trolley rail 11. The other shifting means 16 is a sifting means for a supporting member for use in connecting the trolley rail 5 connected to the negative terminal of the power supply with a third trolley rail of which description is eliminated. Connection of the trolley rail 5 for the negative terminal with the third trolley rail by using the supporting member is similarly carried out by the method described in reference to the connection of the trolley rails 4a and 4b for the positive terminal.

In the aforesaid embodiment, the shifting means 16 are arranged at the end surface of the track girder 1c at the longitudinal end of the stationary track girder 1a. However, the shifting means 16 may have the same result as that of the aforesaid embodiment described above in case where they are arranged at the end surface of the track girder 2a in the movable track girder 2. In this case, after the movable track girder 2 is aligned with the stationary track girder 1a and stopped, connection of the ends of the swing levers 22 to the brackets 23 of the supporting members 10 is carried out. Further, the driving cylinder 17 can be also utilized as a driving cylinder arranged for moving other devices such as the rail 3 of the movable track girder 2.

In the aforesaid embodiment, the supporting member 10 is illustrated as one to be supported at the base portion of the first trolley rail 4a by the supporting pivot 9. However, the same effect as that of the aforesaid embodiment can be attained in a case where the third trolley rail 11 is supported at the base portion of the first trolley rail 4a by the linkage mechanism so as to cause them to be moved keeping the longitudinal direction thereof in parallel with the first trolley rail 4a.

In the aforeseid embodiment, the projection 14 is provided at each of both ends of the third trolley rail 11 and the groove 15 is formed at each of the end portions of the first and second trolley rails 4a and 4b. However, the same result as that of the aforesaid embodiment can be attained in a case where the groove 15 is arranged at each of both ends of the third trolley rail 11 and the projection 14 is arranged at each of the end portions of the first and second trolley rails 4a and 4b, respectively. Further, the same result as that of the aforesaid embodiment can be attained in a case where the projection 14 is arranged at one end of each of the third trolley rail 11, the groove 15 is provided at the other end of each of the third trolley rail 11, and the opposing end portions of the first and second trolley rails 4a and 4b are provided with either grooves 15 or projections 14 engaging with the former projection 14 or the former groove 15.

In addition, in the present invention, the same result as that of the aforesaid embodiment can be attained in a case where the slant surfaces formed at both ends of the third trolley rail are of the same projections or grooves having triangular, circular and elliptical sections with the center line in the section perpendicular to the longitudinal direction of the trolley rails or the line in parallel with the center line being an appendix point and the end portions of the opposing first and second trolley rails are formed with either the projections of grooves engaged with the former projections or grooves.

What is claimed is:

1. A connecting system for trolley rails for transport vehicles in which a first end portion of a first trolley rail supported on a stationary track for guiding the transport vehicle is to be connected to a second end portion of a second trolley rail supported on a movable track for guiding the transport vehicle, said system comprising:
 a supporting member supported at said first end portion of the first trolley rail supported on said stationary track and movable in a direction crossing with a moving direction of said movable track with respect to the first trolley rail;
 a third trolley rail having a length to be inserted between the first and second end portions of said first and second trolley rails;
 first slant surfaces formed at each of said first and second end portions of said first and second trolley rails inclined in a longitudinal direction of said first and second trolley rails to the top peripheral edge thereof;

second slant surfaces formed at each of both end portions of said third trolley rail inclined in a longitudinal direction of said third trolley rail to the bottom peripheral edge thereof;

supporting means for movably supporting said third trolley rail in a longitudinal direction of said supporting member;

spring means in abutment with said supporting member for applying a spring force tending to lower said third trolley rail;

shifting means for shifting said supporting member to a connecting position where the third trolley rail supported on said supporting member has its second slant surfaces formed at both ends to be coincided with said first slant surfaces formed at said first and second end portions of said first and second trolley rails and to a connection releasing position where said third trolley rail is moved away from said first and second trolley rails; and guiding means formed at said first slant surfaces and said second slant surfaces to be engaged with each other to cause said second slant surfaces of the third trolley rail to be coincided with said first slant surfaces of said first and second trolley rails.

2. A connecting system for trolley rails for transport vehicles according to claim 1, wherein said guiding means are comprised of projections having a section formed to have ridge lines in parallel with a center line of one of said first or second slant surfaces and a concave groove closely fitted to said projection formed at the other of said first or second slant surfaces.

3. A connecting system for trolley rails for transport vehicles according to claim 2, wherein the projection formed at said one of said first or second slant surfaces is a linear projection projected from said one of said first or second slant surfaces along the center line of said slant surface and the concave groove formed at said other of said first or second slant surfaces is a linear groove concaved from said slant surface along the center line.

* * * * *

UNITED STATES PATENT AND TRADEMARK OFFICE
CERTIFICATE OF CORRECTION

PATENT NO. : 5,161,758

DATED : November 10, 1992

INVENTOR(S) : Masamoto Shuto

It is certified that error appears in the above-indentified patent and that said Letters Patent is hereby corrected as shown below:

In Column 9, line 11, change "in abutment with" to --provided between said third trolley rail and--;

line 12, delete "a" and change "tending to lower" to --to--;

line 13, after "rail" enter --in opposite longitudinal directions of said third trolley rail--; and lines 17 to 18, change "coincided" to ----aligned--.

UNITED STATES PATENT AND TRADEMARK OFFICE
CERTIFICATE OF CORRECTION

PATENT NO. : 5,161,758
DATED : November 10, 1992
INVENTOR(S) : Masamoto Shuto

It is certified that error appears in the above-indentified patent and that said Letters Patent is hereby corrected as shown below:

In Column 10, line 3, change "to cause said second slant surfaces" to --for causing both sides--;

line 4 change "coincided" to --aligned--;

lines 4 to 5, change "said first slant surfaces" to --both sides--; and line 5, after "rails" enter --, respectively--.

Signed and Sealed this

Twenty-sixth Day of October, 1993

Attest:

BRUCE LEHMAN

Attesting Officer        Commissioner of Patents and Trademarks